United States Patent
Hanes, Jr. et al.

[11] 3,780,679
[45] Dec. 25, 1973

[54] APPARATUS FOR PRODUCING ENDLESS BANDS

[76] Inventors: James Gordon Hanes, Jr., Pfafftown; James Frank King, 925 Goodwood Rd., Winston-Salem; Willie M. Lathery, 1342 Tredwell Dr., Winston-Salem; Howard L. Beamon, 2626 Dudley St., Winston-Salem; Kenneth W. Newlen, 613 Runyon Dr., High Point, all of N.C.

[22] Filed: Sept. 29, 1971

[21] Appl. No.: 184,722

[52] U.S. Cl. ............ 112/121.27, 112/130, 156/266
[51] Int. Cl. ........................................... D05b 23/00
[58] Field of Search ................. 112/121.12, 121.11, 112/121.15, 121.29, 2, 104, 130, 121.26, 121.27, 10; 38/3; 156/266, 517

[56] References Cited
UNITED STATES PATENTS

| | | | |
|---|---|---|---|
| 2,053,257 | 9/1936 | Anderson | 112/2 |
| 678,788 | 7/1901 | Millhiser et al. | 112/10 X |
| 2,722,903 | 11/1955 | Larkin | 112/121.15 |
| 3,191,557 | 6/1965 | Moore | 112/121.12 |
| 3,377,972 | 4/1968 | Cohen et al. | 112/104 |
| 3,384,040 | 5/1968 | Frettoloso | 38/3 X |
| 3,426,708 | 2/1969 | Andersson | 112/121.26 |
| 3,448,707 | 6/1969 | Thomsen | 112/130 X |

FOREIGN PATENTS OR APPLICATIONS

| 981,292 | 1/1965 | Great Britain | 112/10 |
|---|---|---|---|

*Primary Examiner*—James R. Boler
*Attorney*—Charles Y. Lackey

[57] ABSTRACT

An apparatus and method for automatically producing endless bands from strips of material wherein a segment of a predetermined length is detached from a material strip of greater length and subsequently joined together at its ends to form an endless band. A label is secured to the formed band at a predetermined location. The segment is preferably severed from the material strip, sewn together at its free ends, and provided with a desired label by a suitable apparatus adapted for barring and tacking operations. The various steps of construction are preferably completed at a plurality of work stations as a movable supporting surface moves the segment through a predetermined arrangement of said stations.

4 Claims, 21 Drawing Figures

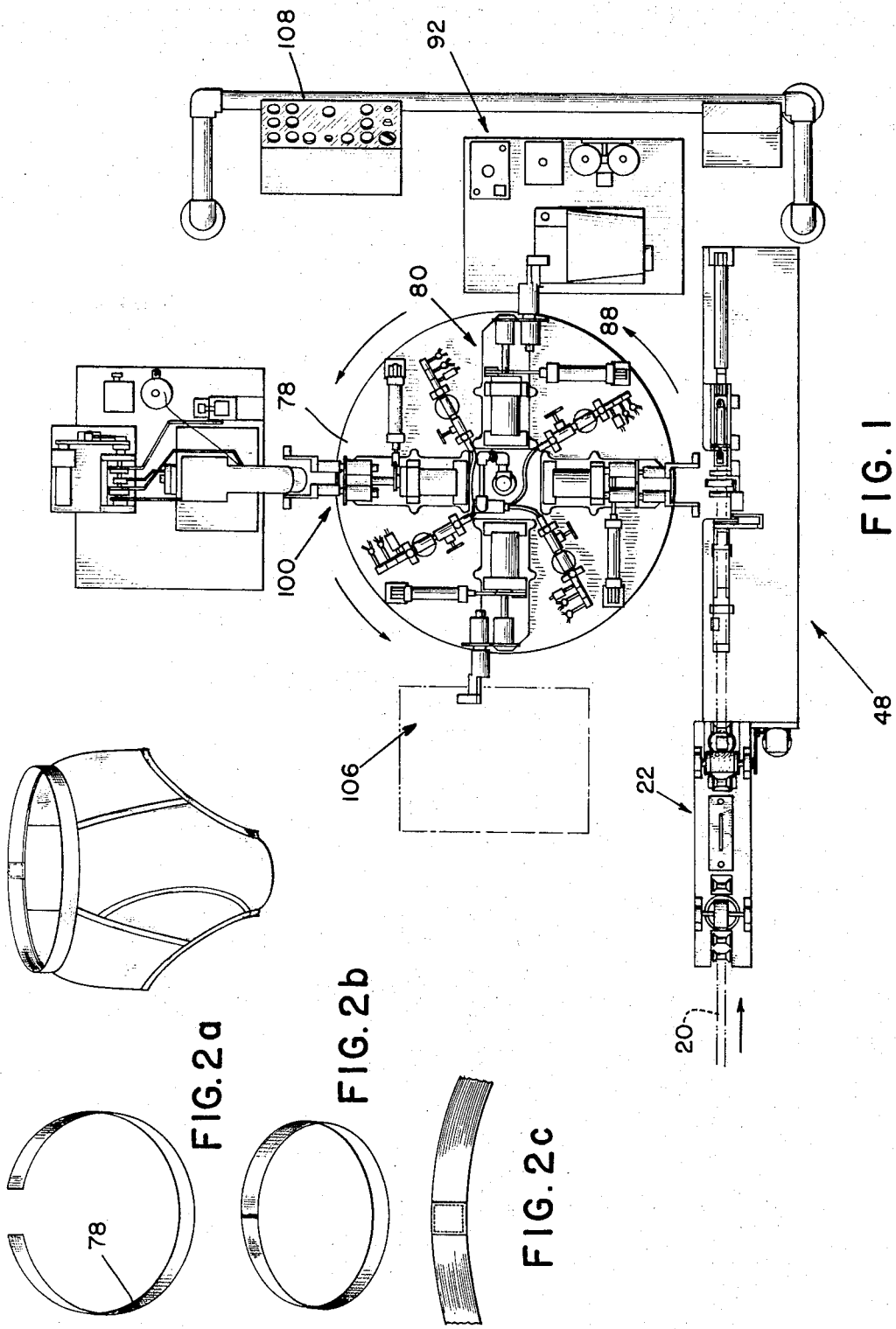

PATENTED DEC 25 1973　　　　　　　　　　3,780,679

APPARATUS FOR PRODUCING ENDLESS BANDS

BACKGROUND, BRIEF SUMMARY AND OBJECTIVES OF THE INVENTION

The present invention relates to an apparatus and method most suitably, but not limited to, adapted for the fabrication of textile products. The invention is especially intended for the manufacture of endless elastic bands used in the fabrication of undergarments requiring, for example, a stretchable waistband.

One conventional procedure for producing endless elastic bands such as those used in the fabrication of undergarments has been to measure the length of the segment from which the band will be formed from a strip of longer material, cut the segment to the requisite length, align the free ends under the pressure foot of a sewing machine, sew the ends together, and finally to attach the band to the body of the garment. A label is then applied at the seamed ends of the elastic band after completion of the garment. Alternatively, the label can be sewn directly to the joined band prior to attachment of the band to the garment.

Another more sophisticated procedure for producing endless bands has been to feed a plurality of festooned lengths of banding material to a specifically designed rack from which an operator can measure up to 24 strips at one time. These strips are then severed manually by the operator and given to a second attendant who ties the batch of segments and indicates a size. These sized segments are then forwarded to a sewing station where each segment is joined to form an endless band. The joined segment then moves to another station where a label is manually attached at the joined location. The completed bands are then placed with other fabric components and moved to a fabricating station where, in one or more operations, the garment is completed.

A number of machines have been developed to automate the steps of measuring, severing and joining the produced segments, however, these devices are limited to a degree in that they include components to draw the material strip through a desired distance and sever the segment either before or after the free ends are joined together. Even when these free ends are automatically sewn after the severing operation, it is still necessary to manually withdraw the formed band and position it at a suitable sewing device for the attachment of the label.

The present invention is designed to completely automate the fabrication and labeling of endless bands especially intended for use with undergarments requiring a stretchable waistband component. In preferred form, the most desirable apparatus includes a cutting element for detaching a segment of a selected length from a material strip, a sewing machine for joining the free ends of the segment to form an endless band, and a sewing machine adapted for barring and tacking operations to secure a label to the formed band at a desired location on the band, and means for transporting the band from operation to operation. The apparatus in preferred form further includes a feeding mechanism and pressing element used to remove wrinkles and folds in the material strip prior to the severing and joining operations.

As suggested in the preceding summary, one of the principle objectives of the present invention is to provide an apparatus of the character described which will fully automate the fabrication and labeling of endless elastic bands such as used in the fabrication of undergarments.

Another objective of the present invention is to provide a continuous process for the manufacture and labeling of endless elastic bands wherein the band is completely formed and labeled without a single manual step.

A further objective of the present invention is to provide an apparatus of the character described in which the size of the formed band loops can be selectively varied without interfering with the automatic operation of the device.

Still another objective of the present invention is to provide an apparatus of the character described which will allow severance of a segment of desired length from a continuous supply of strip material.

Yet a further object of the present invention is to provide an apparatus of the character described which contains additional components for feeding the material strip pressing the material strip to remove wrinkles and folds and moving the material strip, severed segment and formed band through the series of operations previously described.

Still another object is to provide an apparatus that will sever and join a segment of predetermined length and label that joined segment without continuously or periodically monitoring or remeasuring the length of the segment.

These and other objects and advantages of the present invention will become more apparent after consideration of the following detailed description taken in conjunction with the accompanying drawings wherein like characters of reference designate like parts throughout the several views.

FIGURE DESCRIPTION

FIG. 1 is a preferred embodiment of the apparatus forming a part of the present invention showing the feeding mechanism, the pressing station, the severing component, the sewing mechanism for joining the severed segment, and the label attaching device, all positioned peripherally about a selectively rotatable work supporting surface carrying a plurality of movable and releasably securing clamping devices for handling the formed bands.

FIG. 2(a) through 2(c) is a sequential portrayal of the steps in forming and labeling an endless elastic band and its attachment to the body portion of an undergarment.

Figure 5:
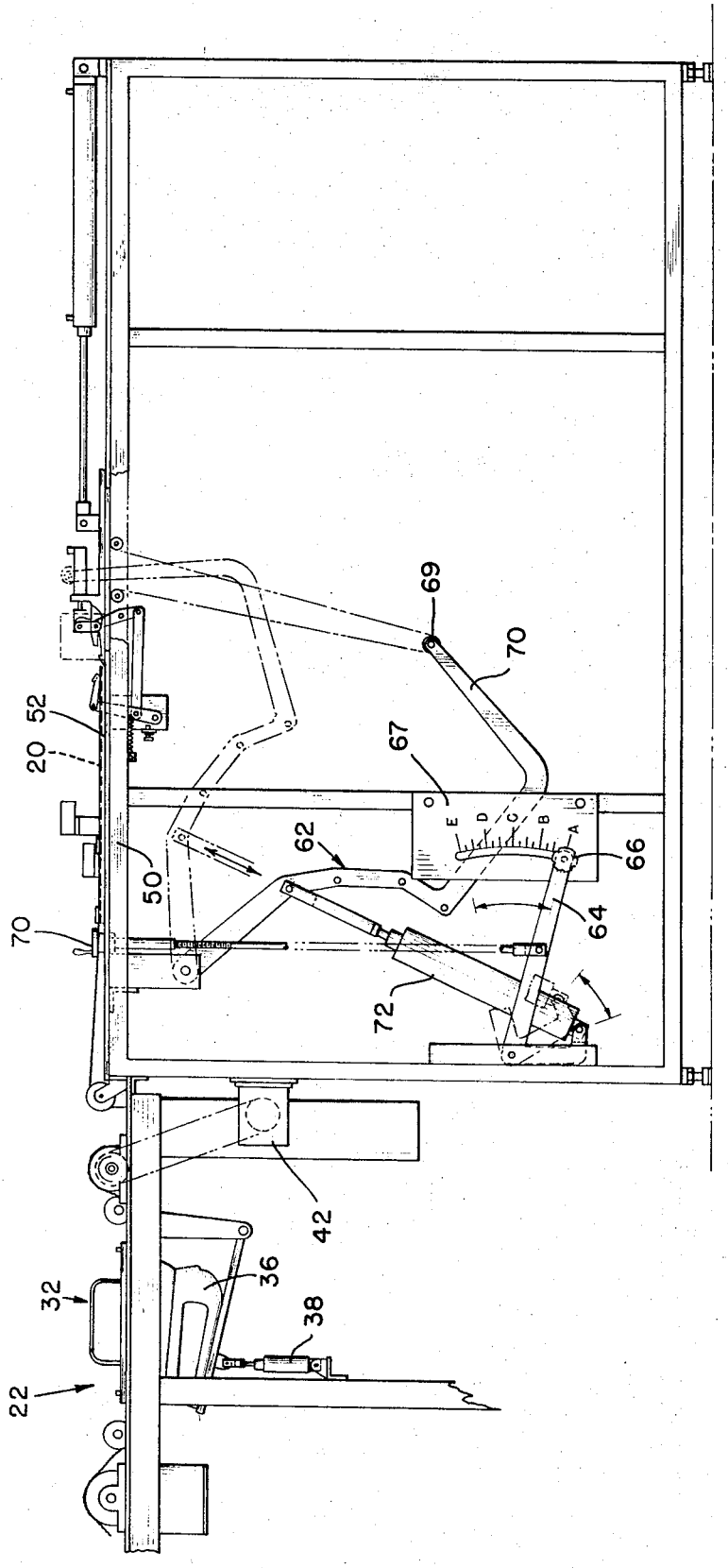

FIG. 5 is a side elevational, sectional and fragmentary view of the pressing component, the feeding mechanism and the component for detaching a segment of selected length from a strip of continuous material, particularly illustrating the movable clamping device for securing and pulling the free end of the material strip for a preselected distance and the adjustable linkage used to extend the length of the material strip by a predetermined amount.

Figure 6:
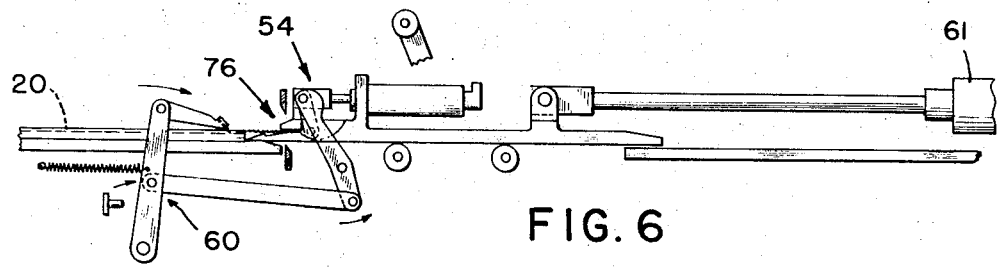

FIG. 6 is a side elevational, sectional, fragmentary and enlarged view of the securing and pulling element shown in relationship with the other components illustrated in FIG. 5 wherein the free end of the continuous material strip has been clamped but not yet displaced.

Figure 7:
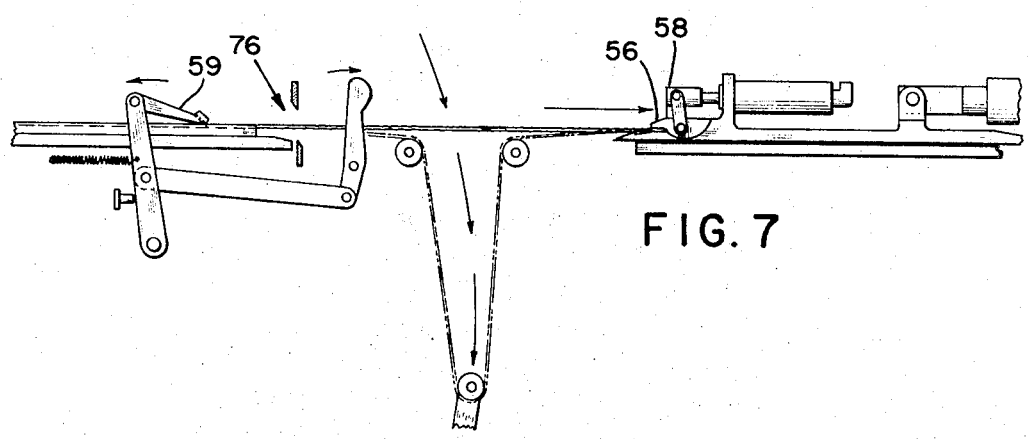

FIG. 7 is a side elevational, sectional, fragmentary and enlarged view of the apparatus shown in FIG. 6 wherein the free end of the continuous material strip has been extended by a preselected amount.

Figure 8:
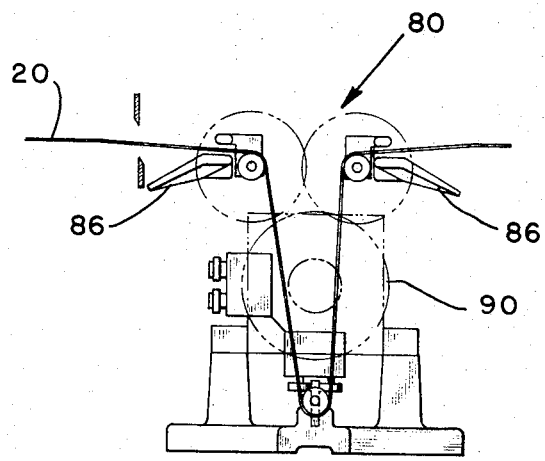

FIG. 8 is an end elevational, sectional and isolated view of a releasably securing segment clamper just prior to securement of the continuous material strip and severing of that strip to form a segment of predetermined length.

Figure 9:
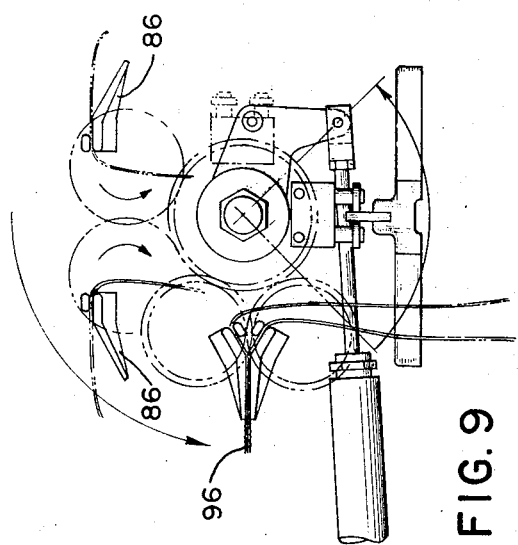

FIG. 9 is an end elevational, sectional, fragmentary and schematic view of the segment clamper shown in FIG. 8 illustrating the plural securing units in a first and open band end position and then in a preselected closed band end position.

Figure 10:
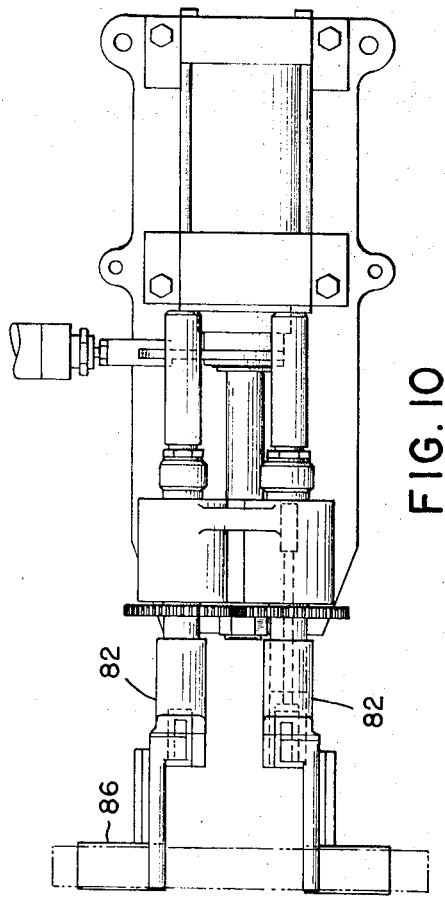

FIG. 10 is a plan, sectional and fragmentary view of the segment clamper shown in FIG. 9.

Figure 11:
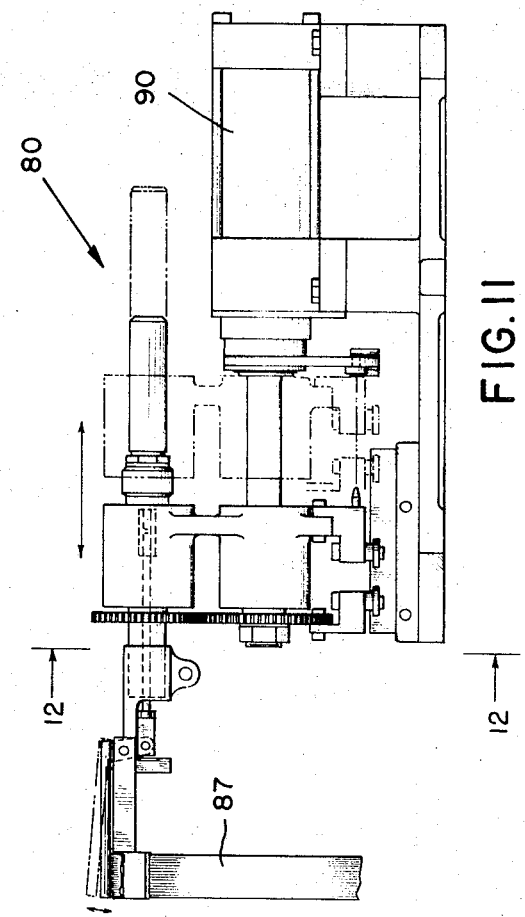

FIG. 11 is a side elevational, sectional, fragmentary and schematic view of the segment clamper shown in FIGS. 9 and 10 displaceable longitudinally from the full line to the hidden line position and back again.

Figure 12:
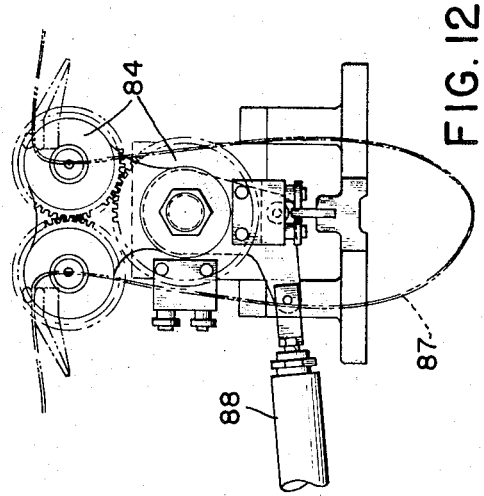

FIG. 12 is a sectional view taken along the line 12—12 of FIG. 11.

Figure 13:
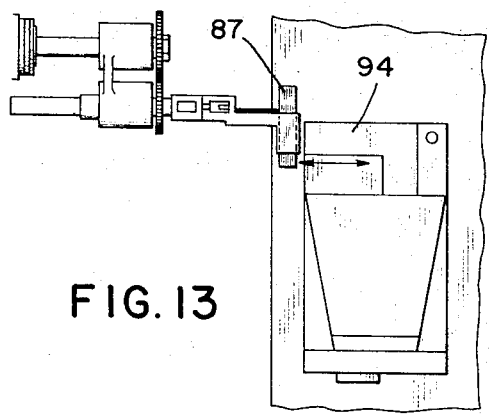

FIG. 13 is a plan, fragmentary and schematic view of the sewing machine and segment clamper forming the joining station of the present invention illustrating the longitudinally displaceable feature of the segment clamper with respect to the sewing machine.

Figure 14:
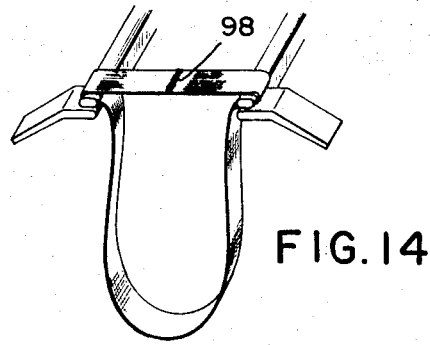

FIG. 14 is a perspective and fragmentary view of the joined band formed by the operation illustrated in FIG. 13 after the clamper securing members have returned to their original segment receiving position.

Figure 15:
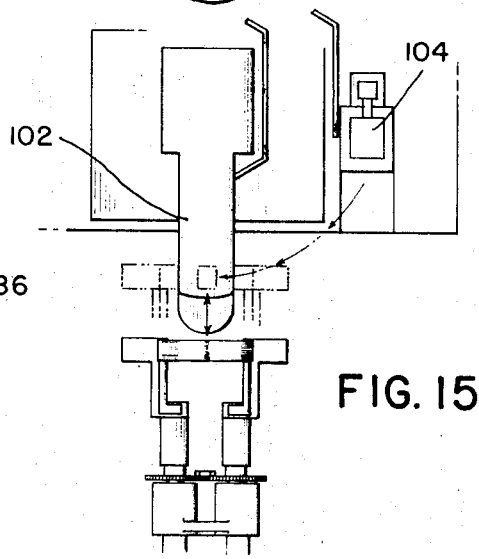

FIG. 15 is a plan, fragmentary and schematic view of the labeling station of the present invention which includes the movable and releasably securing segment clamper, the sewing machine especially adapted for barring and tacking operations and the label dispenser holding a supply of labels to be attached sequentially to joined bands.

Figure 16A:
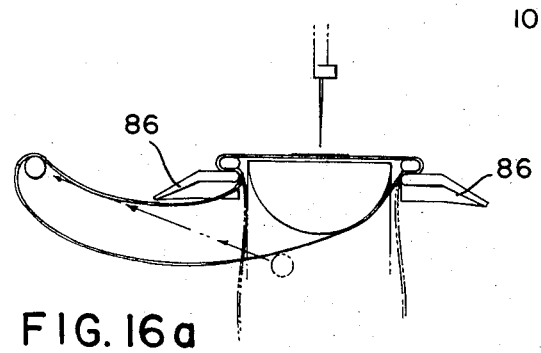
Figure 16B:
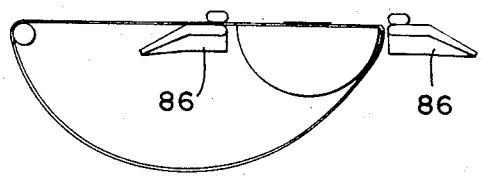
Figure 16:
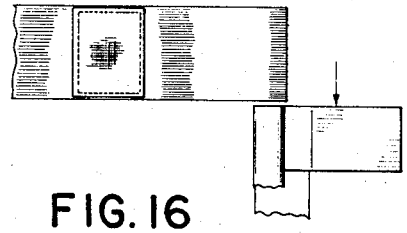

FIG. 16 is a plan, fragmentary and enlarged view of a joined band having a label positioned thereon and illustrating the sewing pattern applied by the barring and tacking machine of FIG. 15.

Figure 16C:
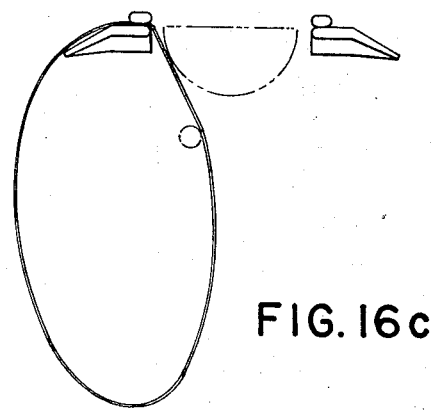

FIG. 16(a) – 16(c) is a sequential portrayal of the sewing operation at the label applying station illustrating the handling of the completed and labeled band after the sewing operation wherein the label is attached.

DETAILED DESCRIPTION OF THE DISCLOSURE

Referring now to the drawings and particularly to FIG. 1, a continuous strip of suitable band forming material shown in hidden lines and designated 20 is moved from a reservoir (not shown) through a pressing station shown generally as 22 and made up of a moisture applicator 24 having an idler 26 partially submerged in a supply of fluid 28 so that the band forming material is continuously dampened as it moves through a plurality of guide rollers 30 (to retain it in a substantially untwisted condition) and over idler 26.

A presser unit 32 includes an upper plate 34 under which passes the band material, a displaceable lower plate 36 suitably heated by appropriate means and selectively positioned in cooperation with the upper plate 34 by any suitable means, for example, air cylinder 38.

Cylinder 38 is connected to a pivotable arm 40 which travels between the pressing position (FIG. 3) and the non-pressing position (not shown) at a lower level.

Figure 4:
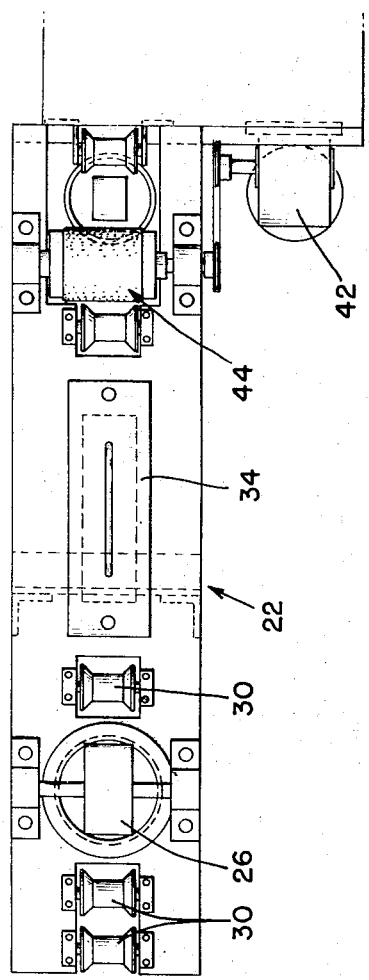
FIG. 4 is a plan, sectional and fragmentary view of the component illustrated in FIG. 3.
Figure 3:
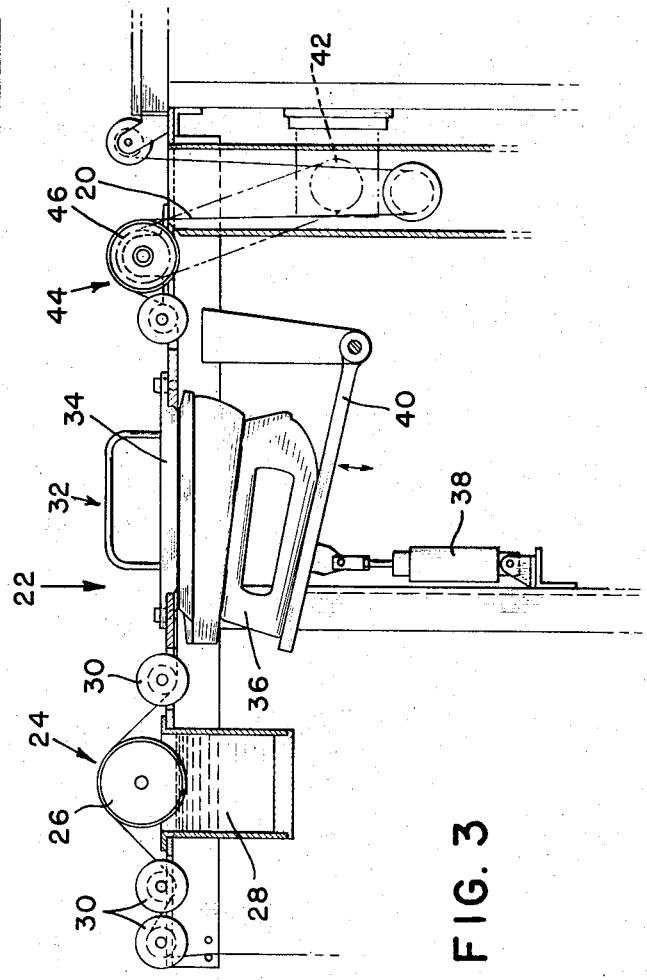
FIG. 3 is a side elevational, sectional and fragmentary view of the component of the present invention for removing wrinkes and folds from a continuous strip of material showing the moistening and pressing element and their relationship each to the other.

A motor 42 drives pulley 44 as best shown in FIG. 3. The friction of the continuous material strip 20 against the surface 46 of pulley 44 helps move the continuous strip through selected displacements when the measuring and cutting component operates to draw a strip of material of a predetermined length.

A detaching or severing station 48 is formed by a frame 50 having a working surface 52 along which is advanced the continuous band forming material 20. A clamp assembly 54 includes a clamp 58 having a gripping element 56 which engages the free end of the band material 20. Linkage 60 is appropriately actuated to extend the free end of the material strip 20 (by linkage 59) to element 56 and a clamp displacing cylinder 61 is actuated to draw a measured quantity of the material strip 20 as shown in FIGS. 6 and 7. While the displacement of the clamp 58 by cylinder 60 draws the material strip a preselected distance, a linkage 62 is operable to vary the length of the measured segments by a predetermined selectable amount without additional structural components along the surface 52.

Linkage 62 is selectively positioned by the adjustment singularly or in combination of a number of components including a bell crank level 64 pivoted about a stationary point 65 on the frame as the free end 66 of the crank is moved along a graduated scale 67. End 66 can be fixedly secured at a desired location along scale 67 by a thumb screw or other suitable means. A cylinder 68 is secured to the other end of bell crank lever 64 and connects to linkage 62 as shown in FIG. 5. Cylinder 72, when actuated, displaces linkage 62 so that pulley 69, depending upon its downward path of travel from frame 50, will draw a portion of the material strip of a desired and measured length. A hand wheel 70 is used to control a rod 71 connected to bell crank lever 64 and thus provide means for incrementally adjusting end 66 at a precise location along scale 67.

When a section of a continuous strip of band forming material has been drawn and measured, a detaching means, preferably a cutter 76 is actuated and a segment 78 of selected length is formed (see FIG. 2(a)). The sebment is displaced and positioned by associated components which will be described in detail subsequently, and cylinder 60 then is actuated to return the band clamp assembly to its original position so that the free end of the continuous band forming material strip 20 can again be engaged for another measuring and severing operation.

For moving the segments and formed bands from one station to another in the present invention, a rotatable work surface 78 holding a plurality of segment clamping devices 80 or clampers is utilized. The preferred embodiment shows the use of four such devices 80 positioned 90° apart on the work surface 78. Obviously this number may be decreased or increased depending on the particular requirements of the application.

The various components of a single clamping device 80 are illustrated in FIGS. 9 and 12 and include two rotatable arms 82 controlled by a plurality of gears 84 and terminating in a pair of clamping fingers 86 for gripping and turning the ends of a formed segment such as shown in FIG. 11 and designated 87. Rotation of arms 82 is accomplished by a tilting cylinder 88, and longitudinal movement of the arms (see arrow in FIG. 11) is controlled by longitudinal displacing cylinder 90. Clamping fingers 86 can be separated and joined selectively and moved with respect each to the other to orient the held material strip in any manner desired. Longitudinal movement of arms 82 permits the placement of the segment 87 to sewing instrumentalities or other components or locations as needed.

After the band forming material strip has been measured by the clamping and band measuring components discussed previously and illustrated in FIGS. 6 and 7, a clamper 80 secures for handling the measured section (see FIG. 8) just prior to the severing operation. Once the continuous strip has been severed and segment 78 has been formed, it is held by clamper 80 until surface 78 rotates 90° and the segment is carried to the joining station 92.

The joining station is schematically illustrated in FIG. 13 wherein a clamper 80 carrying a segment 87 has introduced the joined ends near the needle of a sewing machine 94. The segment is manipulated as shown in FIG. 9 (hidden lines) wherein the clamping fingers 86 are moved to position the band ends 96 in a contiguous, side by side relationship. The band ends 96 are then displaced by the longitudinal displacing cylinder 90 of clamper 80 until they are joined preferably with an overedge seam by a conventional sewing machine 94.

After the sewing operation to join the band ends 96 together has been completed, the clamper arms 82 are restored to their normal position (see FIG. 14) as work surface 78 is displaced another 90°. Note that the overedge seam 98 is carried intermediate clamper arms 82 and on the upper surface of the band.

The second 90° rotational movement of work surface 78 places the joined band at the labeling station 100 where the band is positioned at the sewing instrumentalities of another sewing machine 102. A label is dispensed from a dispenser 104 to a position directly over the seam 98 and the work piece is then moved with respect to the sewing machine so that the label is completely stitched to the joined band. The labeling operation is schematically illustrated in FIG. 18 and the sewing pattern for attaching the label to the band is shown in an enlarged fashion in FIG. 16.

The technique and improved apparatus for attaching the label to the joined band while omitting or avoiding an unsightly bunching or soiling of the thread during the operation is disclosed with particularity in patent application Ser. No. 125,504 filed Mar. 18, 1971, now U.S. Pat. No. 3,690,276 for SEWING MACHINE which is incorporated herein by reference.

After the labeling operation is completed, the joined and labeled band can be discharged by any convenient means at the labeling station or, alternatively, it can be moved to a discharge station 106 and disengaged from clamper 80 as shown sequentially in FIGS. 16(a) through 16(c). When the work piece has been introduced to the sewing instrumentalities of sewing machine 102, fingers 86 have opened and retracted. When the labeling operation is complete, a selectively movable linkage 108 draws the joined and labeled band so that only one of the fingers 86 secure the band for movement to the discharge station. At that station, the fingers then again open and the band is dropped into a suitable container for movement to that portion of the plant where it might be attached to the balance of the garment. Alternative embodiments of the present invention can release the joined and labeled band from sewing machine 102 so that it will be collected proximate the labeling station 100.

The complete operation of the present invention can be distinctly described by referring to FIGS. 2(a) through 2(d). There a severed segment 78 (FIG. 2(a)) is joined to form an endless band (FIG. 2(b)) and a label is subsequently attached over the junction of the free ends of the band (FIG. 2(c)). The completed band is then attached to the balance of the garment (FIG. 2(d)).

The operation of the illustrated embodiment of the present invention is controlled from a control panel 108 housing appropriate electric circuitry for the programmed operation of the various components. Conventional electrical elements are used for operation of the clampers 80, the air cylinders and the measuring and severing apparatus and are associated with well known stop motion and safety devices to terminate operation of the apparatus in the event of malfunction. Such circuitry and components is well within the capabilities of one skilled in the art of circuit design and mechanical engineering.

While there has been described a preferred embodiment of an apparatus for forming and labeling endless bands, it will be obvious that many modifications and alterations may be made in the various components of this machine including, but not limited to, the measuring and severing apparatus, the band joining device and the labeling components without departing from the spirit and purpose of this concept. Such modifications and alterations as well as continuing improvements are contemplated.

We claim:

1. An apparatus for forming endless bands from strips of material and applying labels thereto comprising: means detaching a segment of a selected length having two free ends from a material strip; means adjacent said segment detaching means joining the free ends of said segment to form an endless band; means proximate said end joining means securing a label to said formed band, means associated with said detaching means directing the material strip to said detaching means, and means moving the detached segment from said detaching means to said joining means and, after the formation of the endless band, from said joining means to said label sewing means.

2. The apparatus as claimed in claim 1, said moving means including a movable supporting surface, at least one releasably securing segment clamper rotatably and linearly movable independent of said movable supporting surface, means selectively moving said supporting surface, and means selectively moving said clamper.

3. The apparatus as claimed in claim 2 further comprising pressing means adjacent and feeding means.

4. The apparatus as claimed in claim 3, said pressing means including material moistening means, and pressure means selectively movable against the material drawn from said feeding means to said detaching means.

* * * * *